US005719611A

United States Patent [19]

Nakamura et al.

[11] Patent Number: 5,719,611

[45] Date of Patent: Feb. 17, 1998

[54] INK JET PRINTER WITH HOLDING MEMBER FOR EASILY REPLACING CLEANING MEMBER

[75] Inventors: Shinya Nakamura; Yoshiaki Tanaka; Takahiro Kawaguchi, all of Shizuoka, Japan

[73] Assignee: Kabushiki Kaisha TEC, Shizuoka, Japan

[21] Appl. No.: 438,365

[22] Filed: May 10, 1995

Related U.S. Application Data

[63] Continuation of Ser. No. 93,676, Jul. 20, 1993, abandoned.

[30] Foreign Application Priority Data

Jul. 20, 1992 [JP] Japan .................................... 4-192067
Dec. 18, 1992 [JP] Japan .................................... 4-338627

[51] Int. Cl.[6] ................................ B41J 2/01; F16H 13/00

[52] U.S. Cl. .......................... 347/103; 347/104; 347/105; 476/67

[58] Field of Search .................................... 347/103, 104, 347/105; 476/67

[56] References Cited

U.S. PATENT DOCUMENTS

| | | | |
|---|---|---|---|
| 5,291,224 | 3/1994 | Asano | 346/134 |
| 5,356,231 | 10/1994 | Nakamura et al. | 7/93 |
| 5,409,209 | 4/1995 | Nakamura et al. | 6/93 |
| 5,419,543 | 5/1995 | Nakamura et al. | 7/93 |
| 5,467,116 | 11/1995 | Nakamura et al. | 5/93 |

FOREIGN PATENT DOCUMENTS 0 424 968 5/1991 European Pat. Off. .

OTHER PUBLICATIONS

Patent Abstracts of Japan, vol. 16, No. 384 (N–1296), JP 4 126 253, Apr. 27, 1992.

*Primary Examiner*—Benjamin R. Fuller
*Assistant Examiner*—Raquel Yvette Gordon
*Attorney, Agent, or Firm*—Oblon, Spivak, McClelland, Maier & Neustadt, P.C.

[57] ABSTRACT

An ink jet printer is featured by pinch rollers disposed so as to be in contact with the printed surface of a printed recording sheet to press the printed recording sheet against an ejecting roller in contact with the non-printed surface of the printed recording sheet to advance the printed recording sheet to an ejecting unit, cleaning members disposed in contact respectively with the respective circumferences of the pinch rollers to remove the ink adhering to the circumferences of the pinch rollers, and a holding member detachably holding the cleaning members on one side of the holding member so as to be in contact through an opening with the pinch rollers on another side of the holding member at a specified pressure. The cleaning members can be easily replaced with new ones without requiring special skill.

15 Claims, 8 Drawing Sheets

INK JET PRINTER WITH HOLDING MEMBER FOR EASILY REPLACING CLEANING MEMBER

This application is a Continuation of application Ser. No. 08/093,676, filed on Jul. 20, 1993, now abandoned.

BACKGROUND OF THE INVENTION

1. Field of the Invention

The present invention relates to an ink jet printer capable of forming ink dots in desired patterns on a recording sheet for printing.

2. Description of the Related Art

Referring to FIG. 9 showing a prior art ink jet printer relevant to the present invention, an ink jet print head 102 is included in a printing unit C disposed in a substantially U-shaped sheet feed passage 101 extending between a sheet feed unit A to a sheet ejecting unit B. The ink jet print head 102 is mounted on a carriage, not shown, capable of traveling in directions perpendicular to the paper and jets ink droplets against a recording sheet for printing.

A recording sheet fed from a sheet cassette placed on a feed tray 106 or a hand-fed recording sheet is fed to the printing unit C by the synergetic actions of a feed roller 103 and a leaf plate 104 disposed in the sheet feed passage 101. The feed roller 103 rotates in the direction of the arrow shown in FIG. 9 to advance the recording sheet pressed against thereto by the leaf plate 104 to the printing unit C.

A sheet ejecting mechanism 110A is disposed at the outlet end of the sheet feed passage 101 to eject a recording sheet carrying characters or patterns printed with the ink jet print head 102 (hereinafter referred to as "printed recording sheet"). The sheet ejecting mechanism 110A comprises an ejecting roller 111 for ejecting the printed recording sheet in the direction of the arrow E (FIG. 9), pinch rollers 112 for pressing the printed recording sheet against the ejecting roller 111. The ejecting roller 111 is disposed behind the ink jet print head 102 with respect to the direction of travel of the printed recording sheet and supported for rotation in the direction of the arrow (FIG. 9). The pinch rollers 112 can be pressed against the ejecting roller 111 with springs or the like. Preferably, the circumferences of the pinch rollers 112 are serrated to reduce the area of contact between the printed recording sheet and the pinch rollers 112 so that the ink printed on the recording sheet will not be transferred to the pinch rollers 112. A shaft **112*a* supporting the pinch rollers 112 is journaled for rotation on a pinch roller holder 113 and biased with springs 114 so that the pinch rollers 112 are pressed against the ejecting roller 111**.

A plurality of cleaning rollers 115 are supported on the pinch roller holder 113 so as to be in contact respectively with the pinch rollers 112 to remove the ink adhering to the circumferences of the pinch rollers 112. The number of the cleaning rollers 115 of the ink jet printer shown in FIG. 9 is six. The cleaning rollers 115 are supported for rotation on a support shaft 116 held on the pinch roller holder 113.

The feed roller 103 rotates to advance a recording sheet fed from the feed tray 106 along the sheet feed passage 101, the ink jet print head 102 of the printing unit C prints desired characters on the recording sheet, the printed recording sheet is advanced in the direction of the arrow E (FIG. 9) by the synergetic actions of the ejecting roller 111 and the pinch rollers 112, and the printed recording sheet is stored on a delivery tray 119 with its printed surface facing up.

The pinch rollers 112 are driven for rotation by the ejecting roller 111, and the cleaning rollers 115 are driven for rotation by the pinch rollers 112. Thus, even if the printed recording sheet is brought into contact with the pinch rollers before the ink printed on the recording sheet is dried up and the ink is transferred from the printed recording sheet to the pinch rollers 112, the ink adhering to the circumferences of the pinch rollers 112 is absorbed by the cleaning rollers 115. Consequently, the ink once transferred from the printed recording sheet to the pinch rollers 112 will not be transferred again from the pinch rollers 112 to the printed recording sheet to smear the printed recording sheet.

Problems in the related art will be described hereinafter. In general, the circumferences of the pinch rollers 112 of the foregoing known ink jet printer are serrated and, therefore, the cleaning rollers 115 in contact with the serrated circumferences of the pinch rollers 112 are abraded rapidly. Thus, the circumferences of the cleaning rollers 115 become nappy in a comparatively short period of use to deteriorate the cleaning function, i.e., the ink absorbing ability. Such worn cleaning rollers 115 must be replaced with new ones. When replacing the worn cleaning rollers 115 with new ones, the pinch roller holder 113 is removed from the main frame of the ink jet printer, the support shaft 116 supporting the worn cleaning rollers 115 is removed from the pinch roller holder 113, the worn cleaning rollers 115 are replaced with new cleaning rollers 115, the support shaft 116 supporting the new cleaning rollers 115 is put on the pinch roller holder 113, and then the pinch roller holder 113 is mounted on the main frame of the ink jet printer so that the pinch rollers 112 are pressed against the ejecting roller 111 at a specified pressure. Thus, the change of the cleaning rollers 115 requires much time and labor, and professional knowledge and skill. Accordingly, it is practically difficult for the ordinary user to change the cleaning rollers 115.

Furthermore, the pinch roller holder 113 is an elongate member having a length equivalent to the width of the printed recording sheet and liable to be deformed in a curved shape during manufacture. If the pinch roller holder 113 is deformed in a curved shape, it is possible that the support shaft **112*a* supporting the pinch rollers 112 and the support shaft 116 supporting the cleaning rollers 115 cannot be extended in parallel to each other, so that some of the cleaning rollers 115 are unable to be in proper contact with the corresponding pinch rollers 112. If the cleaning rollers 115 are not properly in contact with the corresponding pinch rollers 112, the ink adhering to the pinch rollers 112 cannot be completely and effectively removed with the cleaning rollers 115, and the ink remaining on the pinch rollers 112** is transferred again to the printed recording sheet.

Still further, when a thick sheet, such as an envelope, is inserted between the ejecting roller 111 and the pinch rollers 112, the movement of the pinch rollers 112 away from the ejecting roller 111 is obstructed by the cleaning rollers 115 and, consequently, the pinch rollers 112 are unable to rotate smoothly to hinder the ejection of the sheet.

SUMMARY OF THE INVENTION

Accordingly, it is a first object of the present invention to provide an ink jet printer provided with cleaning rollers capable of being easily changed without requiring special skill.

A second object of the present invention is to provide an ink jet printer provided with a plurality of pinch rollers and capable of uniformly removing the ink adhering to the pinch rollers.

A third object of the present invention is to provide an ink jet printer capable of smoothly ejecting the printed recording sheet regardless of the thickness of the printed recording sheet.

In one aspect of the present invention, a sheet feed passage for guiding a recording sheet from a sheet feed unit to a sheet ejecting unit is formed, an ink jet print head is disposed on the sheet feed passage to print the recording sheet traveling along the sheet feed passage, an ejecting roller is disposed on the sheet feed passage so as to be in contact with the non-printed surface of the printed recording sheet to advance the printed recording sheet to the ejecting unit, a plurality of pinch rollers are disposed opposite to the ejecting roller so as to be in contact with the printed surface of the printed recording sheet, cleaning members are disposed so as to be in contact respectively with the circumferences of the pinch rollers and detachably held on a cleaning member holding unit capable of positioning the cleaning members so as to be in contact respectively with the pinch rollers at a specified pressure and to be easily changed without requiring special skill.

In another aspect of the present invention, a sheet feed passage for guiding a recording sheet from a sheet feed unit to a sheet ejecting unit is formed, an ink jet print head is disposed on the sheet feed passage to print the recording sheet traveling along the sheet feed passage, an ejecting roller is disposed on the sheet feed passage so as to be in contact with the non-printed surface of the printed recording sheet to advance the printed recording sheet to the ejecting unit, a plurality of pinch rollers are disposed opposite to the ejecting roller so as to be in contact with the printed surface of the printed recording sheet, cleaning members are disposed so as to be in contact respectively with the circumferences of the pinch rollers and detachably held on a cleaning member holding unit capable of positioning the cleaning members so as to be in contact respectively with the pinch rollers at a specified pressure to remove uniformly the ink adhering to the pinch rollers.

BRIEF DESCRIPTION OF TEE DRAWINGS

DETAILED DESCRIPTION OF THE PREFERRED EMBODIMENTS

Figure 1:
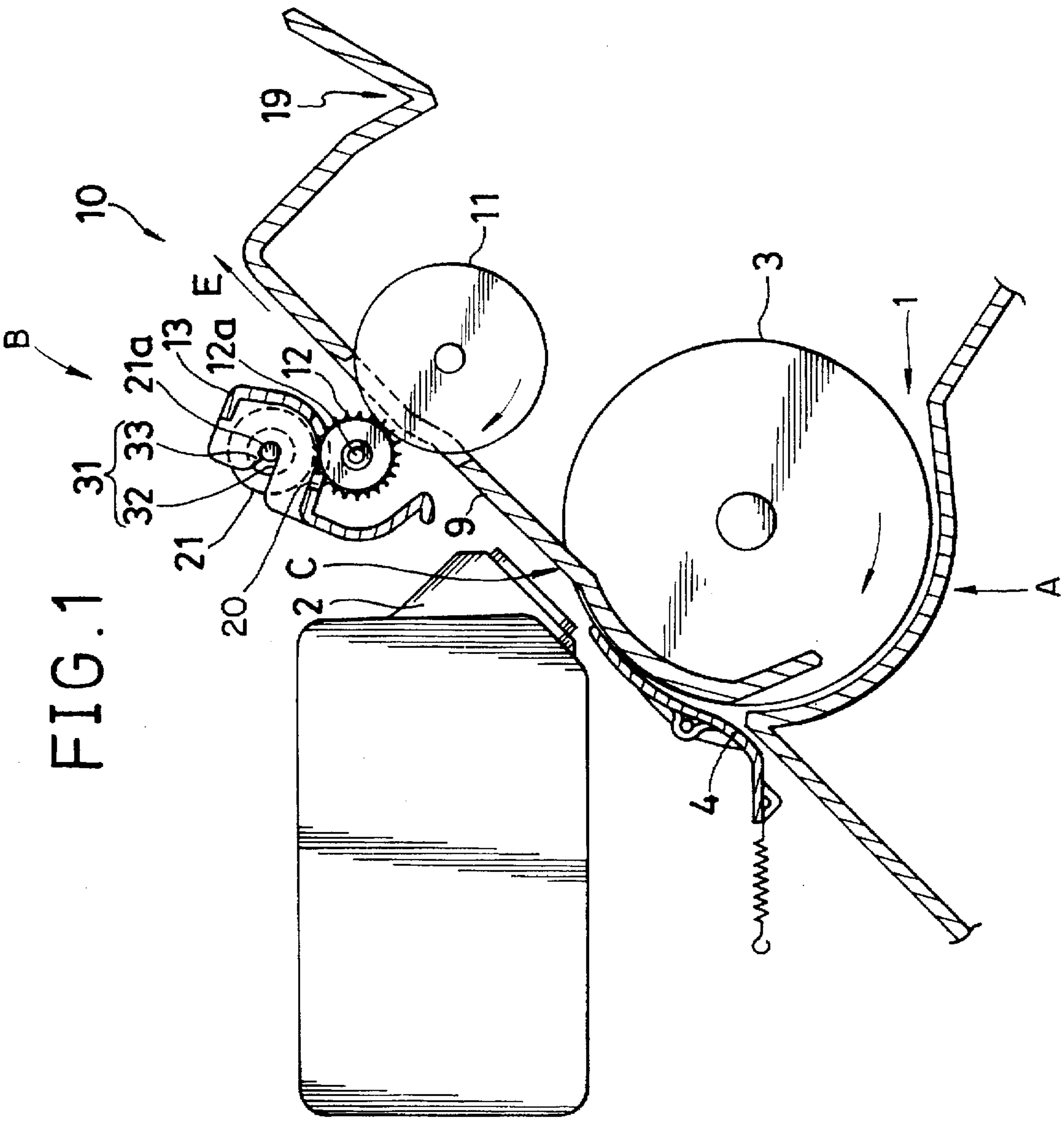
FIG. 1 is a sectional side view of an essential portion of an ink jet printer in a first embodiment according to the present invention, in which a main case and sheet feed unit are omitted.
Figure 2:
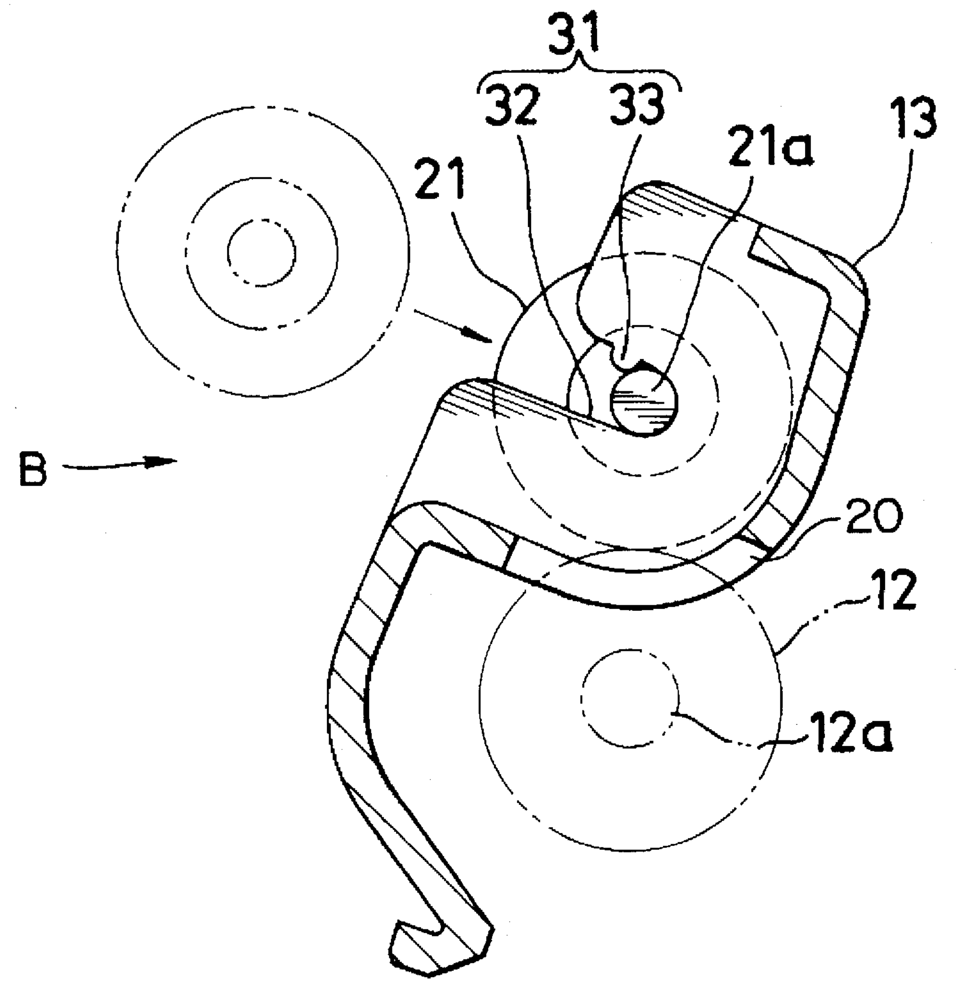
FIG. 2 is a schematic sectional view of a cleaning member holding unit holding cleaning rollers.
Figure 3:
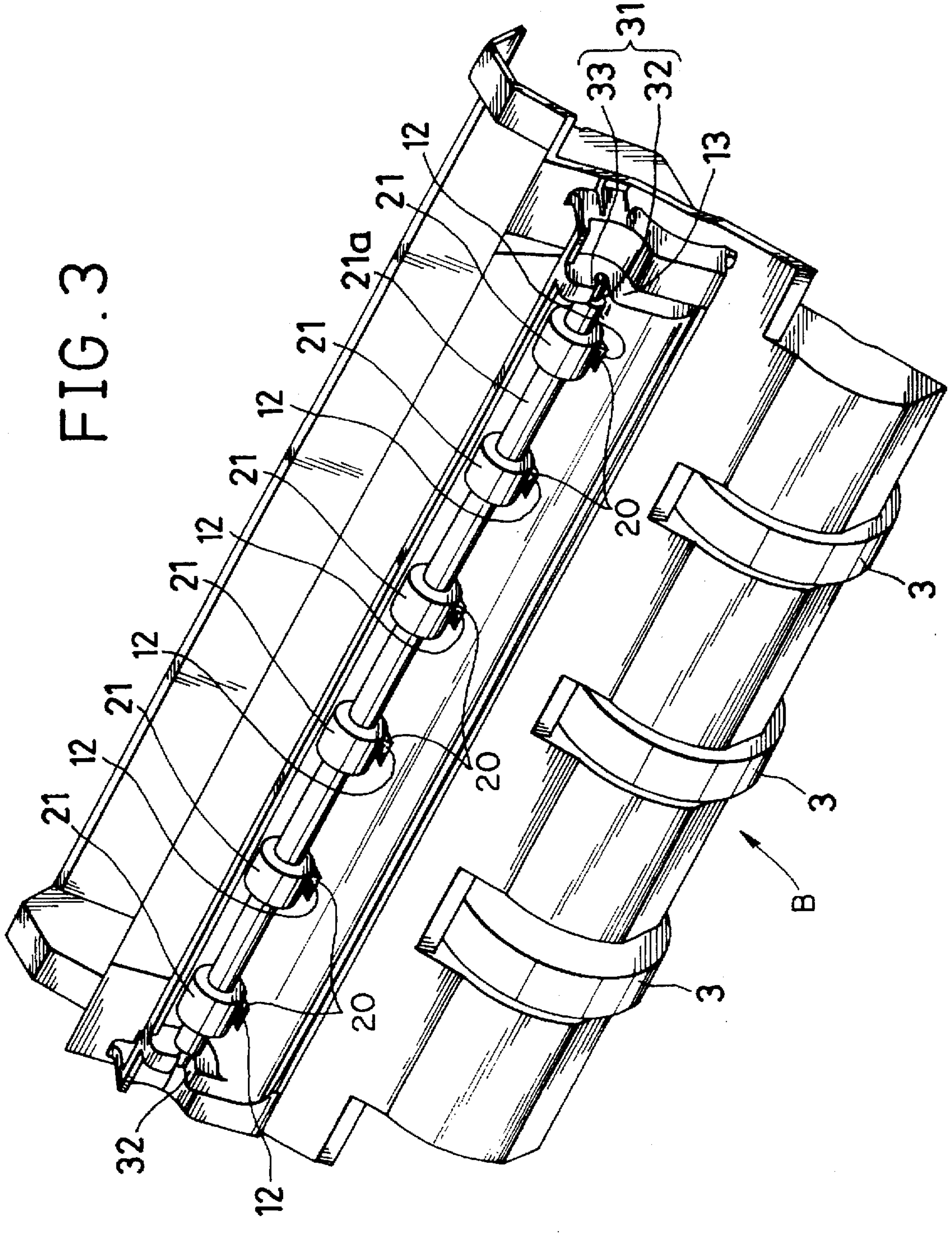
FIG. 3 is a perspective view of the cleaning member holding unit of FIG. 2.

Referring to FIGS. 1 to 3, an ink jet printer in a preferred embodiment according to the present invention comprises a feed roller 3, an ink jet print head 2, and a sheet ejecting mechanism 10 comprising an ejecting roller 11 and pinch rollers 12, which are arranged sequentially along a sheet feed passage 1. The sheet feed passage 1 is defined by a sheet guide panel 9 having a substantially U-shaped cross section and associated parts so as to extend from a sheet feed unit A via a printing unit C to a sheet ejecting unit B. The sheet feed unit A has a sheet feed tray, not shown, the ink jet print head 2 is included in the printing unit C, and the sheet ejecting unit B has a delivery tray 19. The feed roller 3 is disposed at a position corresponding to a substantially U-shaped bend formed in the sheet feed passage 1. The feed roller is driven for rotation by a driving unit, not shown, to feed recording sheets stacked in layers on the sheet feed tray sequentially one at a time into the sheet feed passage 1 and feeds the recording sheet to the printing unit C in cooperation with a leaf plate 4. The ink jet print head 2 is mounted on a carriage, not shown, capable of traveling in directions perpendicular to the paper as viewed in FIG. 1 to print desired characters and the like on the recording sheet by jetting ink droplets against the recording sheet. The sheet ejecting mechanism 10 is disposed immediately before the sheet delivery tray 19 on the sheet feed passage 1. The ejecting roller 11 of the sheet ejecting mechanism 10 is partially protruded through openings 20 formed in the sheet guide panel 9 into the sheet feed passage 1.

The pinch rollers 12 are disposed so as to be in contact with the printed surface of the printed recording sheet on which characters and the like have been printed by the printing unit C to press the printed recording sheet against the ejecting roller 11 so that the printed recording sheet is advanced in an ejecting direction, i.e., the direction of the arrow in FIG. 1, by the synergetic-actions of the ejecting roller 11 and the pinch rollers 12. In this embodiment, the number of the pinch rollers 12 is six. The pinch rollers are supported for rotation on a support shaft 12*a* held on the roller holder 13.

Cleaning rollers 21, namely, cleaning members, formed of a material capable of efficiently absorbing the ink are supported for rotation on a support shaft 21*a*. The support shaft 21*a* is held on a roller holder 13 so that the cleaning rollers 21 are disposed above the printing unit C and in contact with the respective circumferences of the pinch rollers 12, respectively. In this embodiment, the number of the cleaning rollers 21 is six.

Cleaning roller holding structures 31 for detachably holding the support shaft 21*a* supporting the cleaning rollers 21 are formed respectively in the opposite side walls of the roller holder 13. The roller holder 13 (FIG. 2) is S-shaped and has a concave opening formed on a first side, where the cleaning roller 21 is positioned, and another concave opening on an opposite, second side, where the pinch roller 12 is positioned. When the support shaft 21*a* is held in the cleaning roller holding structures 31 on the roller holder 13, the cleaning rollers 21 are pressed against the respective circumferences of the pinch rollers 12, respectively, at a specified pressure. As shown in FIG. 2, each cleaning roller holding structure 31 has a positioning recess 32 and a protrusion 33. When the opposite ends of the support shaft 21*a* are fitted in the positioning recesses 32, the support shaft 21*a* is positioned by the cooperative function of the positioning recesses 32 and the protrusions 33 so that the cleaning rollers 21 are held in contact with the respective circumferences of the pinch rollers 12 at a specified pressure. The positioning recesses 32 are inclined at a specified angle to a horizontal plane so as to open upward to be exposed to an access area where the cleaning roller is replaced.

With this structure, the pinch rollers 12 are shielded from the access area and an operator can easily replace the cleaning roller 21 without ink from the pinch roller 12 dirtying the operator.

The feed roller 3 is rotated to pull out the recording sheets stacked on the sheet feed tray one at a time into the sheet feed passage 1 and to feed the recording sheet to the printing unit C. The ink jet print head 2 of the printing unit C prints desired characters and the like on the recording sheet. Subsequently, the ejecting roller 11 and the pinch rollers 12 cooperate to advance the printed recording sheet in an ejecting direction, i.e., in the direction of the arrow E (FIG. 1). Thus, the printed recording sheet is ejected into the delivery tray 19 and stored on the delivery tray 19 with the printed surface thereof facing up.

The cleaning rollers 21 in contact with the respective circumferences of the pinch rollers 12 absorb the ink transferred from the printed recording sheet to the pinch rollers 12 and adhering to the respective circumferences of the pinch rollers 12 to clean the pinch rollers 12.

When the cleaning rollers 21 are worn into happy rollers and the cleaning function of the same is deteriorated, the support shaft 21*a* supporting the cleaning rollers 21 is pulled out from the positioning recesses 32 of the roller holder 13, and another support shaft 21*a* supporting new cleaning rollers 21 is forced into the bottoms of the positioning recesses 32, deforming the protrusions 33, whereby the new cleaning rollers 21 are positioned correctly respectively in contact with the respective circumferences of the pinch rollers 12 at the specified pressure. Thus, the worn cleaning rollers 21 can be easily replaced with the new cleaning rollers 21 without requiring special skill.

The positioning recesses 32 serve as both means for positioning the cleaning rollers 21 and means for holding the cleaning rollers 21 in place. The simple construction of the positioning structures 31 each having the positioning recess 32 and the protrusion 33 simplifies the construction of the ink jet printer, reduces the number of component parts of the ink jet printer and enables the ink jet printer to be formed in a relatively small construction. Since the positioning recesses 32 open upward on a high level and the cleaning rollers 21 are disposed above the printing unit C, the cleaning rollers 21 can be easily put on and removed from the roller holder 13.

Figure 4:
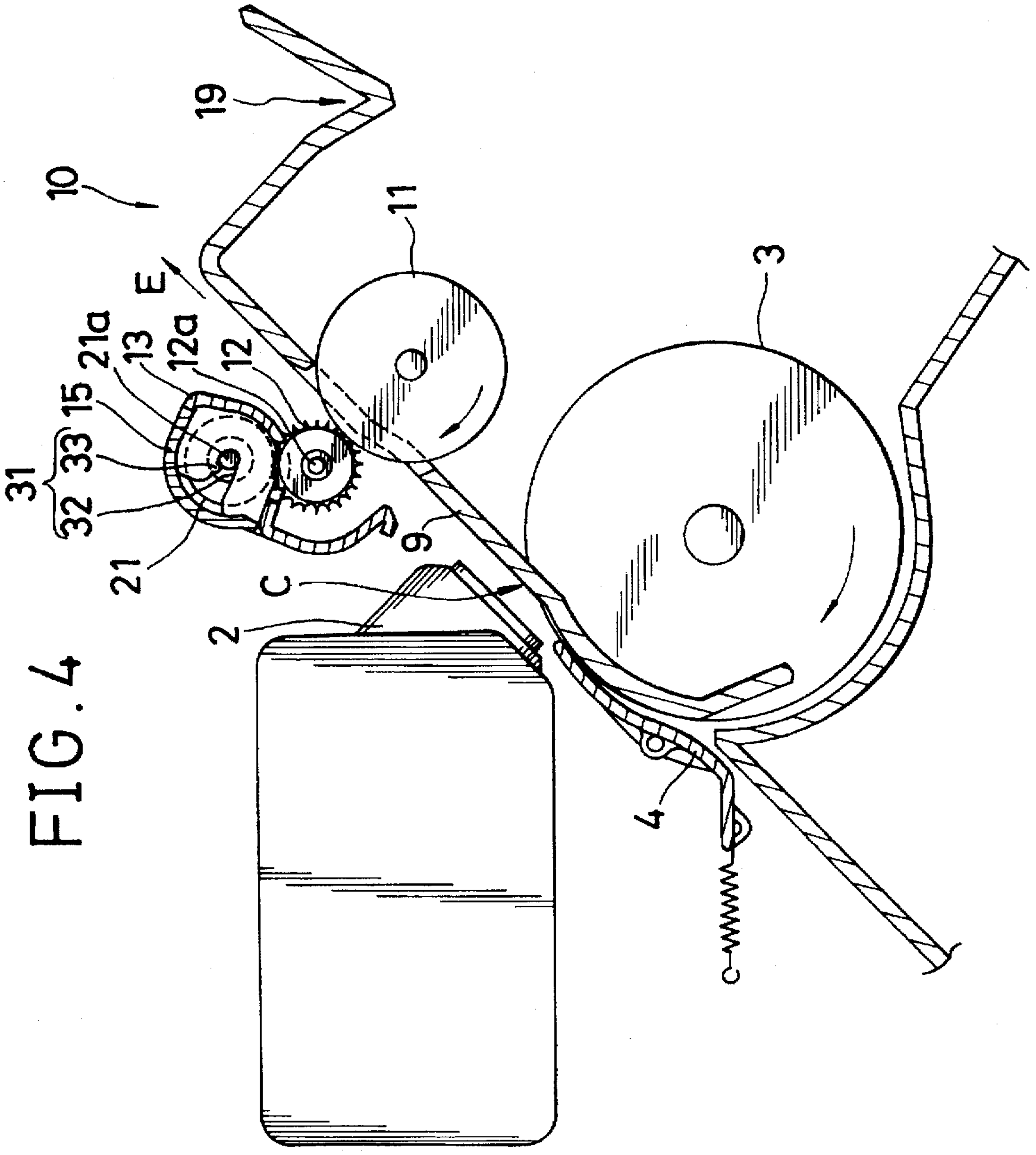
FIG. 4 is a sectional side view of a modification of the ink jet printer of FIG. 1, in which a main case and a sheet feed unit are omitted.

As shown in FIG. 4, a modification of the ink jet printer has a roller holder 13 detachably provided with a protective cover 15 for covering the cleaning rollers 21. The protective cover 15 covers the cleaning rollers 21 so that the hands and the like will not be stained with the ink absorbed by the cleaning rollers 21 when inspecting the internal components of the ink jet printer. The protective cover 15 may be transparent to enable the observation of the condition of the cleaning rollers 21. The protective cover 15 may be hinged on the roller holder 13 so that the protective cover 15 can be moved away from the vicinity of the cleaning rollers 21 to enable the cleaning rollers 21 to be removed from the roller holder 13.

An ink jet printer in a second embodiment according to the present invention will be described hereinafter with reference to FIGS. 5 to 8, in which parts like or corresponding to those of the ink jet printer in the first embodiment are denoted by the same reference characters and the description thereof will be omitted.

Figure 8:
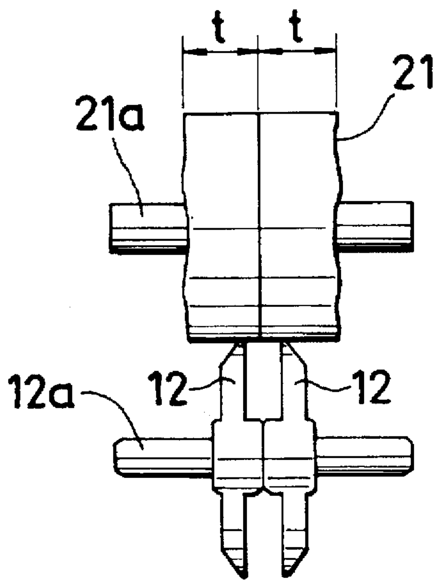
FIG. 8 is a front view of assistance in explaining the positional relation between the pinch roller and the corresponding cleaning roller of the ink jet printer of FIG. 5.
Figure 9:
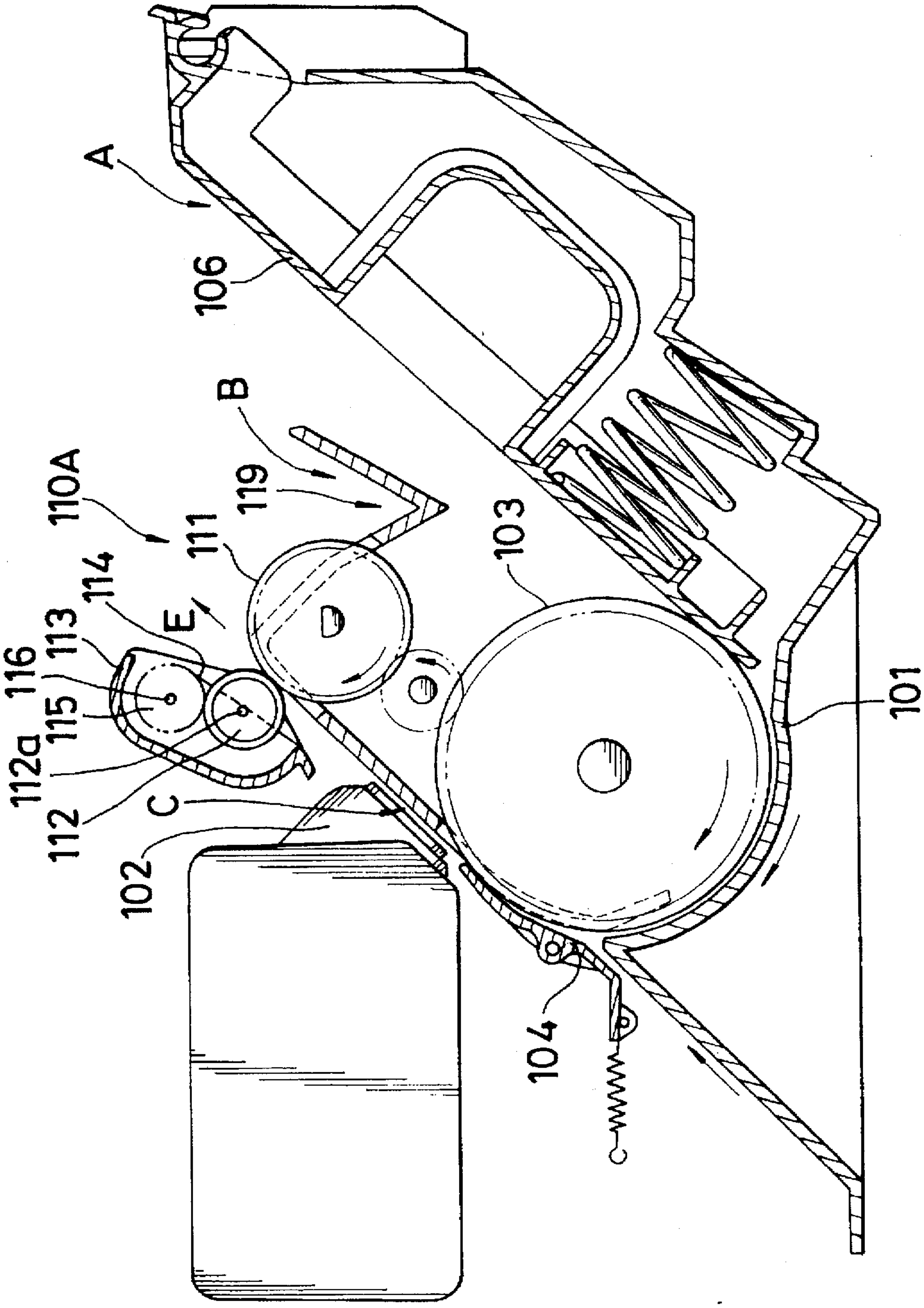
FIG. 9 PRIOR ART
FIG. 9 is a sectional side view of a known ink jet printer relevant to the present invention.

The ink jet printer is provided with six pairs of pinch rollers 12 and six pairs of cleaning rollers. Referring to FIG. 8, each pair of pinch rollers 12 are mounted with a space therebetween on a support shaft 12*a*, and each pair of cleaning rollers 21 are mounted contiguously on a support shaft 21*a*. Each of the cleaning rollers 21 has a surface layer having a thickness t of 4 mm and formed of an urethane elastomer sponge ET (manufactured by BRIDGESTONE KASEIHIN K. K.). The surfaces of the cleaning rollers 21 are finished by grinding.

Figure 5:
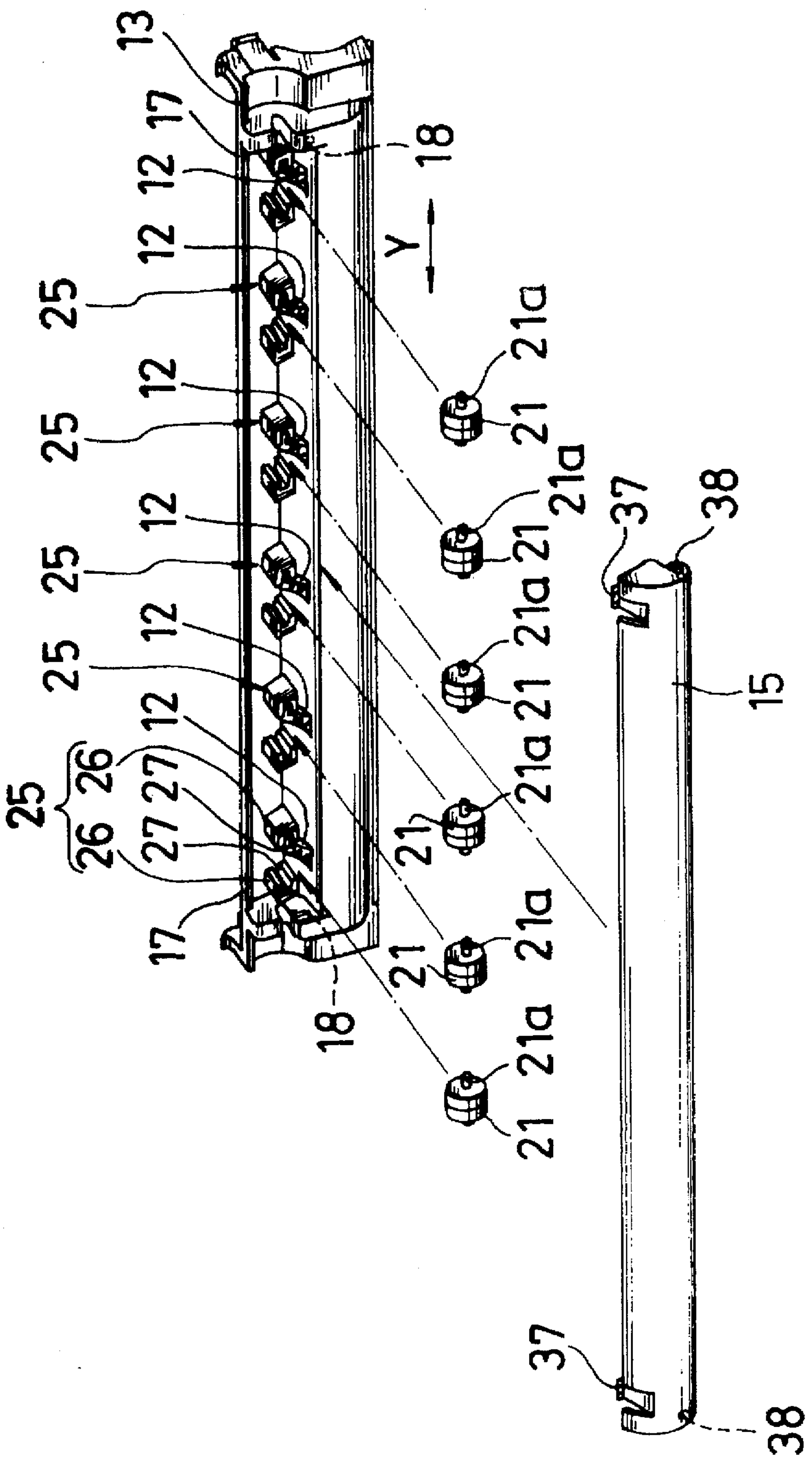
FIG. 5 is a perspective view of a cleaning member holding unit included in an ink jet printer in a second embodiment according to the present invention.

A roller holder 13 is provided with six pairs of first support blocks 22, which are arranged longitudinally, i.e., along the direction of the arrow Y (FIG. 5), at predetermined intervals. Each pair of pinch rollers 12 are supported for rotation in each pair of first support blocks 22 so as to be able to move away from an ejecting roller 11. The first support blocks 22 are provided respectively with taper recesses 23 for receiving the support shafts 12*a* supporting the pinch rollers 12. The recesses 23 are inclined at an angle to a horizontal plane and have open ends opening upward, i.e., opening toward the left as viewed in FIG. 6. The inclination of the recesses 23 of the first support blocks 22 are determined so that the pinch rollers 12 are pressed against the ejecting roller 11 at a specified pressure by gravity and able to move smoothly away from the ejecting roller 11. In this embodiment, the inclination of the recesses 23 of the first support blocks 22 to a horizontal plane is 25°. As shown in FIG. 5, the roller holder 13 is provided in each of its opposite ends with a recess 17 and a protrusion 18 for detachably joining a protective cover 15 to the roller holder 13.

Figure 6:
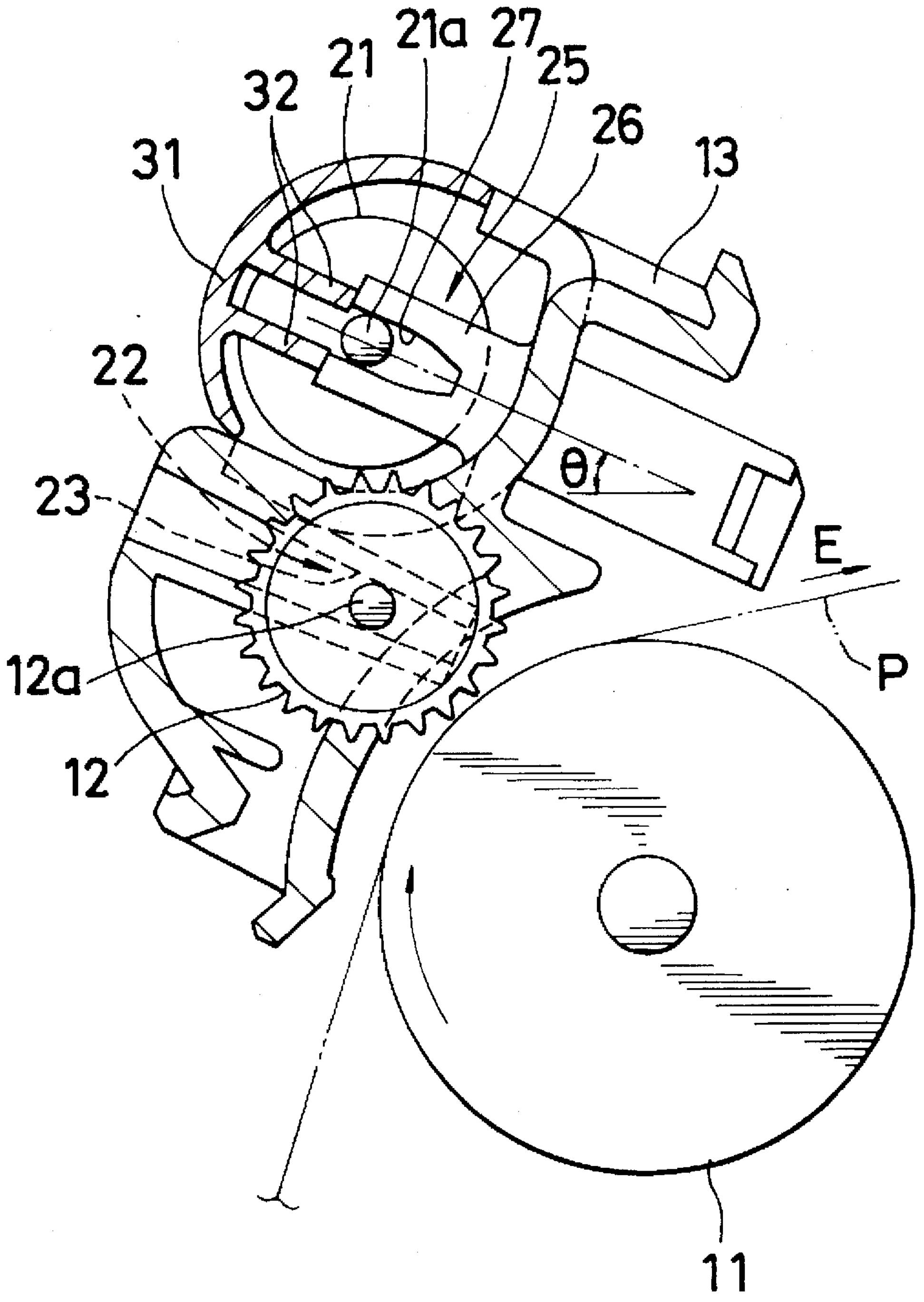
FIG. 6 is a sectional side view of the cleaning member holding unit of FIG. 5 holding cleaning rollers.
Figure 7:
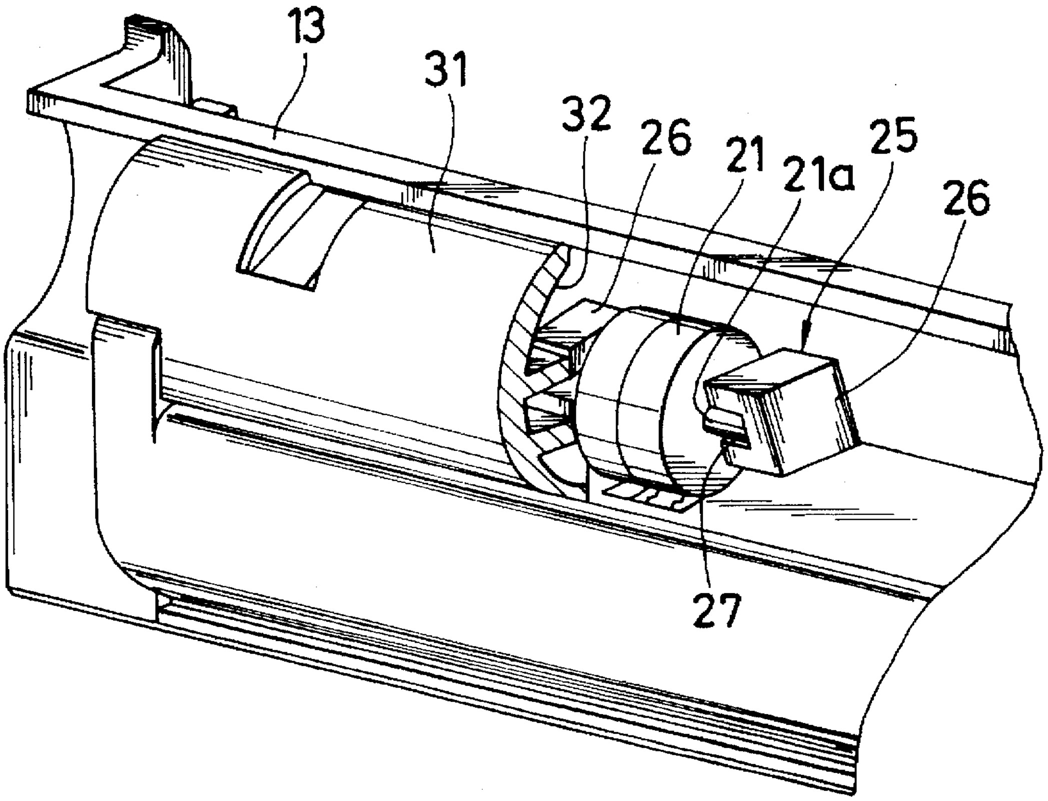
FIG. 7 is a fragmentary perspective view of the cleaning member holding unit of FIG. 5 holding the cleaning rollers.

Referring to FIGS. 5 and 7, the roller holder 13 is provided with six supports 25 at positions respectively corresponding to the six pairs of first support blocks 22. Each support 25 has a pair of second support blocks 26. The second support blocks 26 are provided respectively with recesses 27 to support the support shafts 21*a* each supporting each pair of cleaning rollers 21 for rotation and for free movement in one direction. As shown in FIG. 6, the recesses 27 of the second support blocks 26 are inclined to a horizontal plane and have open ends opening upward, i.e., opening toward the left as viewed in FIG. 6. The inclination θ of the recesses 27 of the second support blocks 26 is determined so that the cleaning rollers 21 are able to move smoothly according to the movement of the pinch rollers 12. In this embodiment, the inclination θ to a horizontal plane is 25°.

The protective cover 15 is joined detachably to the roller holder 13 so as to cover the cleaning rollers 21. The protective cover 15 is provided with hooks 37 and holes 38 corresponding to the recesses 17 and the protrusions 18, respectively of the roller holder 13. When joining the protective cover 15 to the roller holder 13, the protrusions 18 of the roller holder 13 are fitted in the holes of the protective cover 15, and the hooks 37 of the protective cover 15 are brought into engagement with the recesses 17 of the roller holder 13, respectively.

As shown in FIG. 6, the protective cover 15 is provided with a pair of ribs 32 to retain the support shafts 21*a* supporting the cleaning rollers 21 within the recesses 27 of the supports 25 to prevent the cleaning rollers 21 coming into contact with the inner surface of the protective cover 15 and becoming unable to rotate.

Thus, the support shafts 21*a* of supporting the cleaning rollers 21 are supported for rotation in the supports 25 of the roller holder 13 and the cleaning rollers 21 are kept in contact respectively with the pinch rollers 12 by gravity. Therefore, even if the roller holder 13 is deformed in a longitudinally curved shape, i.e., a curved shape with respect to the direction of the arrow Y (FIG. 5), due to incorrect manufacture, the individual cleaning rollers 21 are able to adapt themselves to the deformation of the roller holder 13 and to be in correct contact with the corresponding pinch rollers 12. Thus, the ink adhering to the pinch rollers 12 can be completely removed.

When a thick printed recording sheet P, such as an envelope is inserted between the pinch rollers 12 and the ejecting roller 11, the pinch rollers 12 are moved away from the ejecting roller 11 by the thick printed recording sheet P, and the cleaning rollers 21 move toward the open ends of the recesses 27 according to the movement of the pinch rollers 12. Thus, the movement of the pinch rollers 12 away from the ejecting roller 11 is not obstructed by the cleaning rollers 21, so that the printed recording sheet P, can be smoothly advanced in the ejecting direction, i.e., the direction of the arrow E (FIG. 4). The inclination θ of the recesses 27 receiving the support shafts 21*a* supporting the cleaning rollers 21 is determined so as to secure the smooth movement of the cleaning rollers 21 according to the movement of the corresponding pinch rollers 12. Accordingly, the cleaning rollers 21 can be moved toward the open ends of the recesses 27 by force far lower than that necessary for vertically lifting up the cleaning rollers 21, so that the recording sheet P can be smoothly ejected.

Although this embodiment employs the six pairs of pinch rollers 12 to press the recording sheet P at twelve points to press the recording sheet P against the ejecting rollers 11 so that the recording sheet P will not separate from the ejecting roller 11, the ink jet printer may be provided with six pinch rollers.

What is claimed is:

1. An ink jet printer for printing desired characters on a recording sheet by jetting ink droplets against the recording sheet to create a printed recording sheet, said ink jet printer comprising:

- sheet guide members forming a sheet feed passage extending between a sheet feed unit and a sheet ejecting unit;
- an ink jet print head for printing characters on the recording sheet traveling along the sheet feed passage;
- an ejecting roller disposed in contact with a non-printed surface of the printed recording sheet for ejecting the printed recording sheet into the ejecting unit;
- a saw-toothed pinch roller supported on a single support shaft and disposed in contact with a printed surface of the printed recording sheet to press the printed recording sheet against the ejecting roller;
- a cleaning member supported on a single support shaft and disposed in contact with the pinch roller to remove the ink adhering to the pinch roller;
- a holding member detachably holding said cleaning member being S-shaped and having a major surface forming a first concave enclosure for receiving said cleaning member, and having a second concave enclosure, which is on an opposite side to the first concave enclosure, for receiving the pinch roller, said holding member having an opening to permit a portion of the cleaning member to contact with the pinch roller at a specified pressure; and
- wherein, the second concave enclosure shields the pinch roller from an access area where the cleaning member is replaced.

2. An ink jet printer according to claim 1, wherein said cleaning member is a cleaning roller supported on a single support shaft supported for rotation on said holding member so that the cleaning roller is in rolling contact with said pinch roller.

3. An ink jet printer according to claim 2, wherein said holding member has a positioning recess for positioning said cleaning roller so that said cleaning roller is in contact with said pinch roller at a specified pressure.

4. An ink jet printer according to claim 3, wherein the positioning recess of said holding member opens upward and is inclined to a horizontal plane.

5. An ink jet printer according to claim 3, wherein the positioning recess has protrusion for elastically engaging the support shaft supporting said cleaning roller when the support shaft is seated completely within the positioning recess.

6. An ink jet printer according to claim 1, wherein said cleaning members are disposed on a level above said ink jet print head.

7. An ink jet printer according to claim 1 further comprising a protective cover joined to said holding member so as to be movable between a closed position for covering said cleaning member and an open position for allowing access to said cleaning member when removing said cleaning member from said holding member.

8. An ink jet printer according to claim 2 further comprising a protective cover formed of a transparent material and joined to said holding member so as to be movable between a closed position for covering said cleaning member and an open position for allowing access to said cleaning member when removing said cleaning member from said holding member.

9. An ink jet printer for printing desired characters on a recording sheet by jetting ink droplets against the recording sheet to create a printed recording sheet, said ink jet printer comprising:

- sheet guide members forming a sheet feed passage extending between a sheet feed unit and a sheet ejecting unit;
- an ink jet print head for printing characters on the recording sheet traveling along the sheet feed passage;
- an ejecting roller disposed in contact with a non-printed surface of the printed recording sheet to eject the printed recording sheet into the ejecting unit;
- a saw-toothed pinch roller disposed in contact with a printed surface of the printed recording sheet to press the printed recording sheet against the ejecting roller;
- a cleaning member disposed in contact with the pinch roller to remove the ink adhering to the pinch roller;
- an S-shaped holding member having a first side and a second side, which is opposite the first side, for holding the cleaning member adjacent the first side of said holding member and for holding the pinch roller adjacent the second side of said holding member in contact with the cleaning member through an opening at a specified pressure; and
- wherein, the pinch roller is shielded by the holding member from an access area where the cleaning roller is replaced.

10. An ink jet printer according to claim 9, wherein said cleaning member is a cleaning roller having a support shaft supported for rotation on said holding member.

11. An ink jet printer according to claim 9, wherein said pinch roller is supported so as to be movable toward and away from said ejecting roller, and said holding member holds said cleaning member so as to be movable in synchronism with a movement of said pinch roller for maintaining the specified pressure between the cleaning member and the pinch roller.

12. An ink jet printer according to claim 10, wherein said pinch roller is supported so as to be movable toward and away from said ejecting roller, and said holding member holds the support shaft supporting said cleaning roller so that said cleaning roller is movable in synchronism with a movement of said pinch roller.

13. An ink jet printer according to claim 12, wherein said holding member has recesses for receiving the support shaft supporting said cleaning roller therein so as to support said cleaning roller on said holding member.

14. An ink jet printer according to claim 13, wherein each of said recesses is inclined to a horizontal plane and has an open end opening upward.

15. An ink jet printer according to claim 14 further comprising a protective cover joined to said holding member so as to be movable between a closed position for covering said cleaning roller and an open position for allowing access to said cleaning roller when removing said cleaning roller from said holding member, and provided with ribs formed so as to be disposed contiguously with the open ends of the recesses to retain the support shafts supporting said cleaning roller within the recesses.

* * * * *